United States Patent [19]

Giuganino

[11] 4,196,717

[45] Apr. 8, 1980

[54] SOLAR ENERGY COLLECTING PANEL

[75] Inventor: Piero Giuganino, Turin, Italy

[73] Assignee: Stars Stampaggio Resine Speciali S.p.A., Turin, Italy

[21] Appl. No.: 858,949

[22] Filed: Dec. 9, 1977

[30] Foreign Application Priority Data

Dec. 27, 1976 [IT] Italy ................ 70103 A/76

[51] Int. Cl.² ............................................ F24J 3/02
[52] U.S. Cl. ................................. 126/448; 126/450
[58] Field of Search ............... 165/170, 172; 126/270, 126/271; 237/1 A; 52/171, 209, 616

[56] References Cited

U.S. PATENT DOCUMENTS

| 4,024,853 | 5/1977 | Gordon | 126/271 |
| 4,066,063 | 1/1978 | Gross | 126/271 |
| 4,114,597 | 9/1978 | Erb | 126/271 |

Primary Examiner—Carroll B. Dority, Jr.
Assistant Examiner—Lee E. Barrett
Attorney, Agent, or Firm—Scully, Scott, Murphy & Presser

[57] ABSTRACT

A solar energy collecting panel comprising a hollow collector through which an intermediate fluid is circulated to be warmed by solar radiation incident on the panel. The panel comprises a panel body including a general channel-shaped section comprising first wall having a pair of side walls extending along and projecting from a pair of opposed edges of said first wall, a hollow collector integrally formed with said first wall, a transparent wall, and interengaging means on said transparent wall and said side walls for locating the transparent wall between the side walls and opposite said first wall; the panel further comprising a pair of heads closing respective opposite ends of the panel body for the delivery and collection of said intermediate fluid.

11 Claims, 4 Drawing Figures

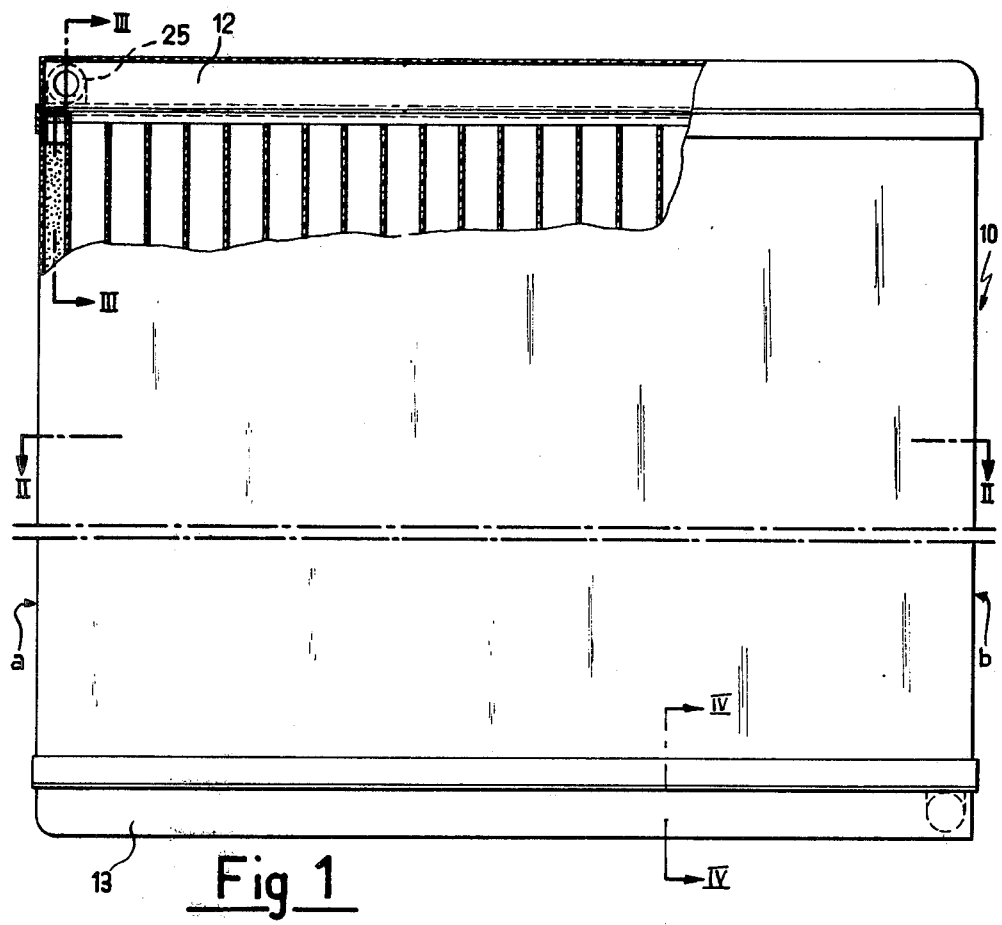
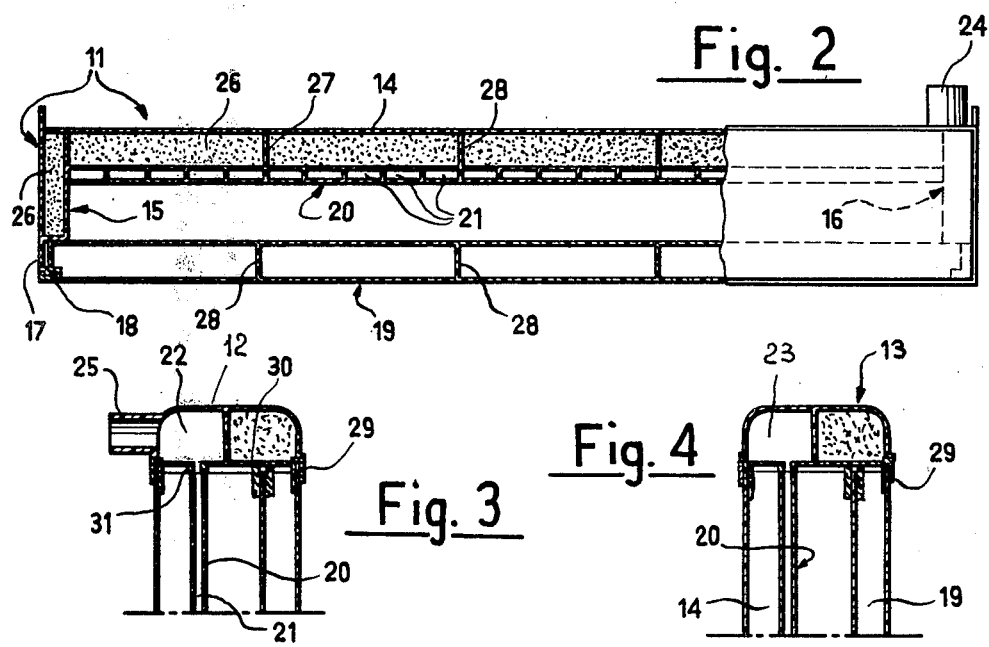

SOLAR ENERGY COLLECTING PANEL

BACKGROUND OF THE INVENTION

The present invention relates to a solar energy collecting panel of the type comprising a hollow, usually cellular, collector through which an intermediate fluid is circulated in use to be heated by solar radiation incident thereon. The heated fluid is brought into heat exchange relationship with an operating fluid, e.g. the fluid of heating installations, the water of a supplying network or the fluid of climatization installations, so as to heat such operating fluid.

SUMMARY OF THE INVENTION

An object of the present invention is to provide a solar energy collecting panel of the type mentioned above, having a simplified structure, a reduced weight per surface unit and, essentially, of a high thermal efficiency with respect to the material used, namely the amount of heat per unit of irradiated surface transferred to the fluid.

Another object of the present invention is to provide a solar energy collecting panel which may be formed from modular sections having different dimensions in order to facilitate its installation according to the use requirements.

The above said and other objects, which will result from the following detailed description, are attained according to the present invention by providing a solar energy collecting panel essentially characterized in that it comprises a panel body comprising a generally channel-shaped section including first wall having a pair of side walls extending along and projecting from a pair of opposed edges of said first wall, a collector integrally formed with thefirst wall, and a transparent wall and interengaging means on the transparent wall and the side walls for locating the transparent wall between the side walls and opposite said first wall, the panel further comprising a pair of heads closing respective opposite ends of the panel body for the delivery and collection of said intermediate fluid. The channel-shaped section and the transparent wall are preferably made by the extrusion of a polymeric material and the heads are preferably made by compression moulding of a polymeric material.

Further, said first wall and said side walls of the panel body preferably have a continuous double wall in which there is provided a filling of a foamed polymeric material for affording thermal insulation. Similarly, the transparent cover may be a double walled construction to increase the so-called "greenhouse effect" resulting in an appreciable reduction of the coefficient of heat transmission from inside to the outside of the panel. The collector, integrally formed with the bottom is preferably adapted to act substantially as a "black body" by making the surfaces thereof exposed to the sunbeams anti-reflecting by for example fine ruling in the extrusion feeding direction. The whole panel, except the heads, preferably has a constant cross-section along its length and comprising parallel wall portions of substantially constant thickness along their lengths in order to make possible its maufacturing by extrusion. It is therefore characterized by constant dimensions in the transverse direction and a constant thickness, while in the longitudinal direction, corresponding to the extrusion feeding direction, it may be sectioned to any size to obtain modules of any required longitudinal dimensions.

DESCRIPTION OF THE DRAWINGS

One embodiment of the invention will be now described by way of example and with reference to the accompanying drawings in which:

FIG. 1 is an elevation, which is partly cut-away, of a panel embodying the invention;

FIG. 2 is a transverse section along line II—II of FIG. 1;

FIG. 3 is a partial longitudinal section along line III—III of FIG. 1; and

FIG. 4 is a partial longitudinal section along line IV—IV of FIG. 1.

Referring to the drawings, numeral 10 indicates a panel according to the invention in its assembled state and comprising a panel body section 11 closed by heads 12 and 13; the panel body is substantially a section formed in turn by a bottom wall 14 having along two of its sides a-b which are parallel to the longitudinal direction of the panel, a pair of projecting side walls 15–16 each being formed with a grooved free edge 17 suitable for receiving edge portions of a transparent wall 19 which is formed along edge portions thereof with grooves 18 suitable to interfit with a wall of the grooved edge 17, which has a stepped cross-section. The bottom wall 14 is formed integrally with a collector 20 comprising a plurality of juxtaposed cells 21 extending longitudinally of the panel and cooperating at each end respectively with a collecting chamber 22 of head 12 and a feeding chamber 23 of head 13. A intermediate fluid, e.g. water suitably treated and desalted, is circulated through the collector cells. The fluid is passed into the collector through a pipe union 24 and the chamber 23 of head 13 and is withdrawn therefrom through a pipe union 25 of chamber 22 of head 12. The fluid is heated in the collector by solar radiation directed through the transparent wall 19 and, in order to increase such heating, the collector 20 is preferably adapted to act substantially as a "black body", by having a black coloring of at least the surfaces thereof exposed to the solar radiation, or by making opaque such surfaces to minimize reflection of such solar energy, e.g. by a fine ruling in the longitudinal direction of the panel. Further, in order to reduce losses through heat dispersion, the bottom wall 14 as well as the side walls 15–16 are preferably of double walled construction to form hollow spaces which are filled with an insulating material 26. The cover 19 is also preferably a double walled construction to increase the so-called "greenhouse effect", namely the reduction of thermal conductivity from the inside to the outside of the panel. The bottom 14 and the cover 19 are also preferably provided with longitudinal ribs 27, 28 to increase their stiffness.

It will be appreciated from the specification and the drawings that the panel body section 11 and the transparent wall 19 comprise rectilinear developments with generating lines extending parallel to the longitudinal direction of the panel. This allows the body section and the transparent wall to be formed by extrusion of a suitable material.

Advantageously, said body and cover are formed of a polymeric material and more specifically, in one embodiment the panel body is made of polypropylene, and the transparent wall, of methacrylate. A number of tests have shown that such materials are particularly suitable in respect of mechanical properties as well as for their ease of extrusion. The insulating filling 26 is advantageously a foamed polystyrene or polyrethane.

To permit manufacture by extrusion using moulding nozzles, the section 11 forming the panel body as well as the transparent wall 19 have constant thickness and transverse dimensions. However each panel body and transparent wall may be formed by separate modules which may be of various lengths, facilitating the use of the system. Further, due to the nature of the interengagement between portions 17–18, the transparent wall 19 is readily connectable to the body 11 by sliding relative thereto. The panel, comprising modules providing the required length of the panel, is completed by the assembly thereon of heads 12 and 13 which also are advantageously made of a polymeric material, preferably polypropylene, and separately manufactured by conventional compression moulding.

The heads are identical but are mounted symmetrically with respect to the longitudinal axis of the panel so that the pipe unions 24–25 are on opposite sides of such axis. To assure a tight fit with the panel each head is further provided with a perimetrical L section flange 29 providing a projecting rim around the head opening which rim engages around the perimeter of respective end portion of the panel body with the interposition of a sealing gasket made of a suitable elastomer.

Chambers 22, 23 are delimited in the respective heads by a bottom wall 30 having a communication opening 31 aligned with the cells of the collector 20; said opening 31 being provided with connection edges which are intimately connected, e.g. by a "mirror" welding, to the corresponding edges of said collector.

Although the use of polymeric material is particularly advantageous for the manufacturing of a panel according to the invention, the panel may be formed of other extrudable material, even a metal, e.g. aluminum or metallic alloys, having equivalent features.

Modifications of the above described embodiments are possible without departing from the scope of the invention.

I claim:

1. A solar energy collection panel comprising:
a panel body of generally channel shape section having a first wall and a pair of side walls extending along and projecting from a pair of opposed edges of said first wall, the first wall and the side walls each having a double wall construction defining a space in which a filling of a heat insulating material is disposed, and said first wall also being formed on the side thereof within the aforesaid channel section with rectilinear passages for the circulation of an intermediate fluid; the panel body having a constant cross-section along its length and having wall members of substantially constant thickness along their lengths, and being made as a single extruded section of polymeric material;
a transparent wall comprising a single extruded section of polymeric material;
interengageable parts on said transparent wall and said side walls for locating the transparent wall between the side walls; and
a pair of closure heads made as separate moulded polymeric parts which close opposite ends of the panel and are formed to provide delivery and collection chambers for intermediate fluid passed in use through said passages, the heads having been connected to the panel after interengagement of the transparent wall and the panel body.

2. A panel according to claim 1 wherein the transparent wall is interengaged with the side walls of the panel body by a slide fit.

3. A panel according to claim 1 wherein said insulating material is foamed polymeric material.

4. A panel according to claim 1, wherein the channel-shaped section and the heads are made of polypropylene, and the transparent wall is made of methacrylate.

5. A panel according to claim 3, wherein the polymeric material is polystyrene.

6. A panel according to claim 3, wherein the polymeric material is polyurethane.

7. A panel according to claim 1, wherein the transparent wall is a double walled construction.

8. A panel according to claim 1, wherein the collector is adapted to act substantially as a black body, by having at least the surfaces exposed to solar energy made non-reflecting.

9. A panel according to claim 1, wherein the heads are identical and include a fluid collecting chamber with a pipe union, the heads being connected to the panel symmetrically with respect to longitudinal axis of the panel.

10. A collecting panel according to claim 9, wherein each head is provided with a perimetrical L-section flange providing a projecting rim which engages around the perimeter of a respective end portion of the panel body to which end portion the rim is connected with the interposition of a sealing gasket of an elastomeric material.

11. A panel according to claim 9, wherein part of each of the collecting chambers is bounded by a bottom wall having an opening provided with connecting edges which are intimately connected, preferably by mirror welding, to corresponding edges of collector.

* * * * *